Figure 9:
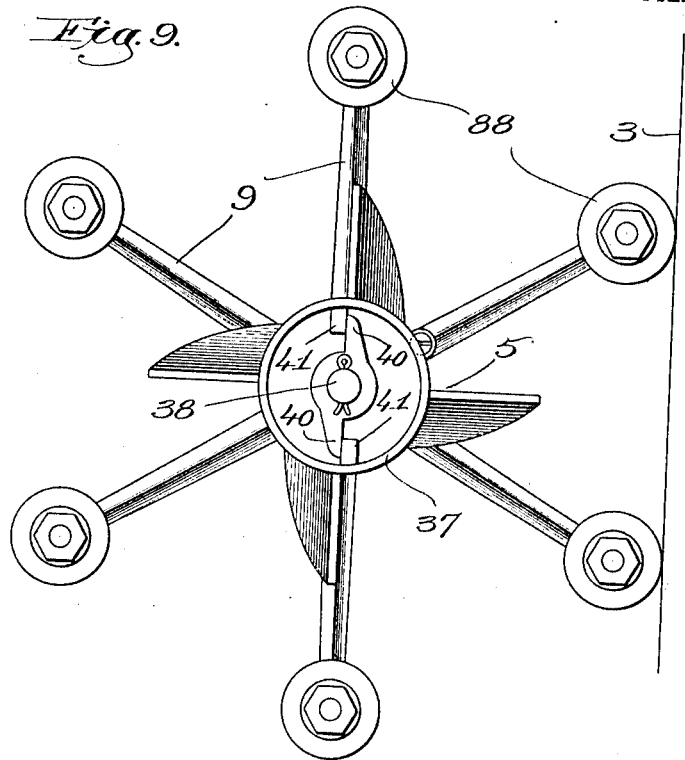

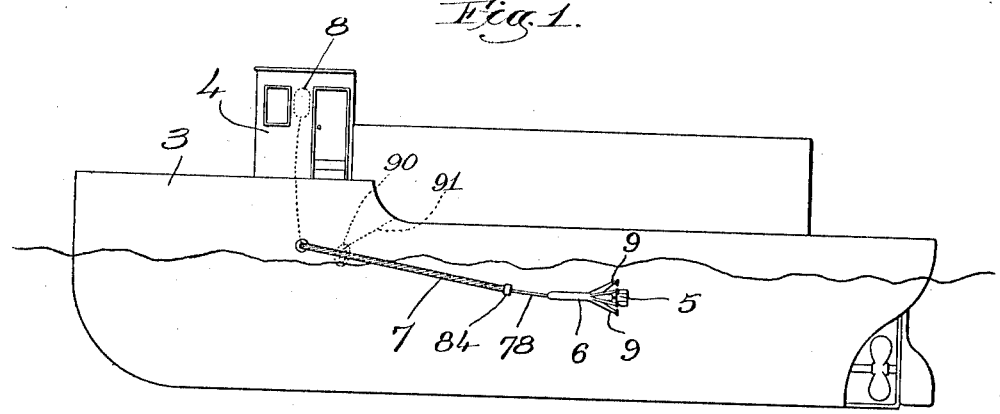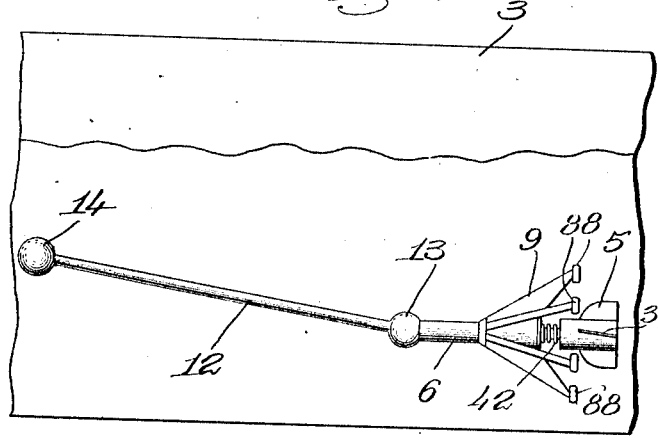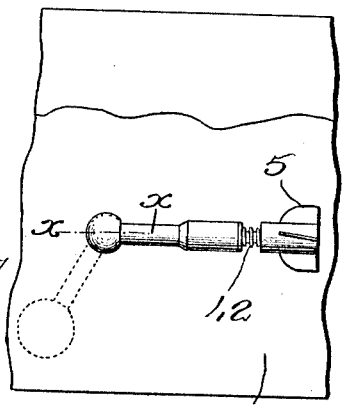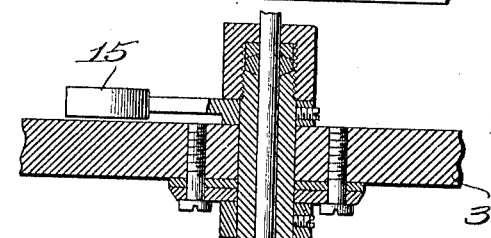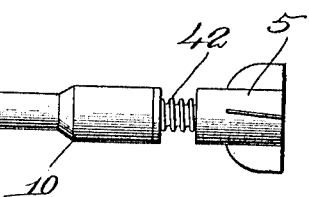

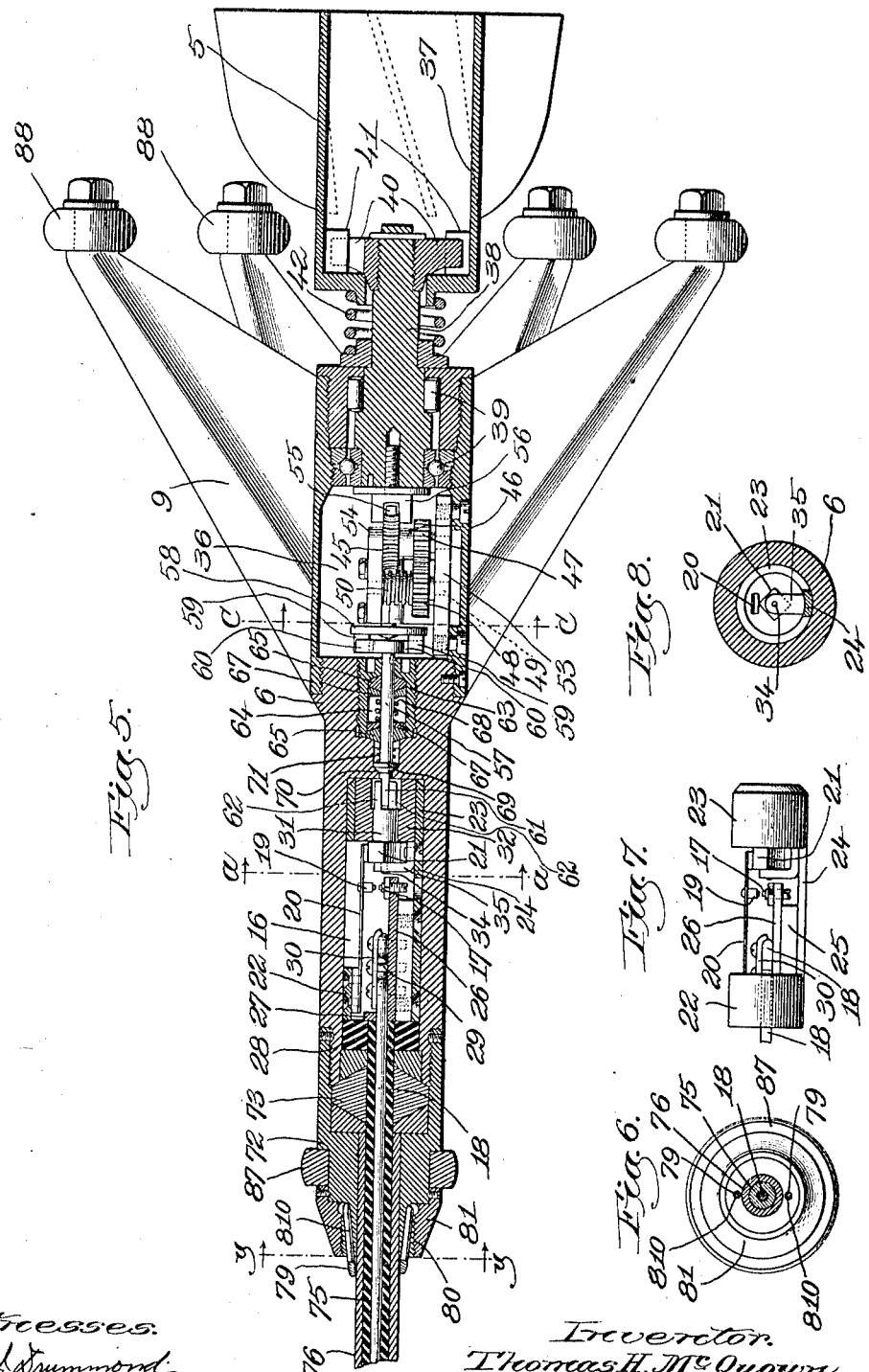

T. H. McQUOWN.
SHIP'S LOG.
APPLICATION FILED FEB. 25, 1910.

1,061,309.

Patented May 13, 1913.
4 SHEETS—SHEET 3.

Witnesses.
Thomas Drummond.
Joseph M. Ward.

Inventor.
Thomas H. McQuown,
by Crosby & Gregory attys.

COLUMBIA PLANOGRAPH CO., WASHINGTON, D. C.

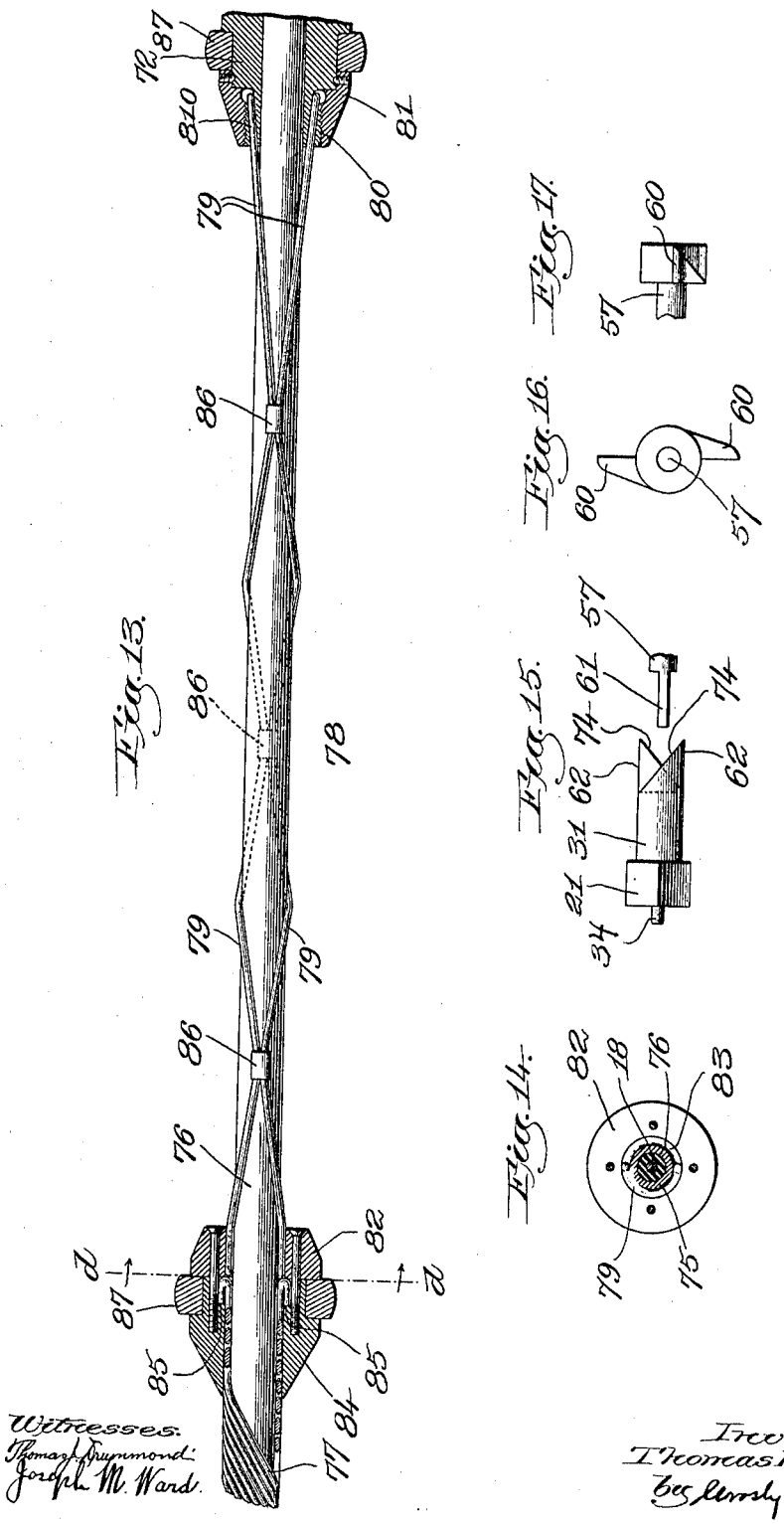

United States Patent Office.

THOMAS H. McQUOWN, OF CAMBRIDGE, MASSACHUSETTS.

SHIP'S LOG.

1,061,309.
Specification of Letters Patent.
Patented May 13, 1913.

Application filed February 25, 1910. Serial No. 545,839.

*To all whom it may concern:*

Be it known that I, THOMAS H. McQUOWN, a citizen of the United States, residing at Cambridge, county of Middlesex, State of Massachusetts, have invented an Improvement in Ships' Logs, of which the following description, in connection with the accompanying drawing, is a specification, like characters on the drawing representing like parts.

This invention relates to ships' logs and has for one of its objects to provide a novel log in which the actuator, whether in the form of a rotor, or any other driving device, is adapted to be placed alongside of the vessel instead of trailing behind the vessel as is the usual custom; and for another of its objects to provide a novel ship's log of this nature which is provided with means for maintaining the actuator out of contact with the side of the vessel.

Still other objects of the invention are to provide a novel electrical ship's log which is efficient in operation, is easy to assemble and repair, and is in other respects an improvement over other electrical logs, as will be more fully set forth hereinafter.

In the drawings I have illustrated the actuator as in the form of a rotor having spiral blades, but my invention is not confined to this type of actuating device. I will use the term rotor hereinafter as indicating generally any actuator which is given its actuating movement by its movement through the water.

Figure 10:
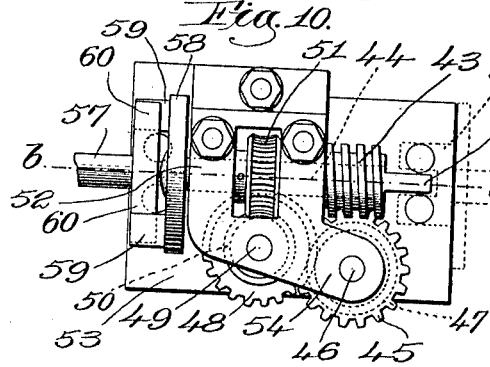
Figure 11:
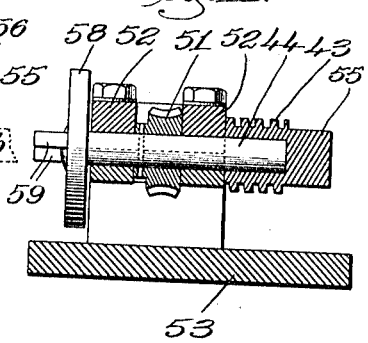
Figure 12:
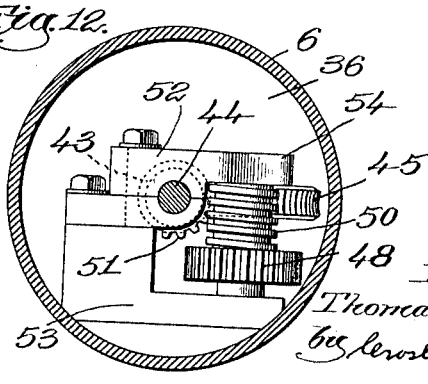

Referring now to the drawings wherein I have shown some embodiments of my invention, Figure 1 is a side view of a ship showing the position of my improved log; Fig. 2 is a portion of a side view of a ship showing a different manner of connecting the log to the ship; Fig. 3 is a view similar to Fig. 2 showing still another manner of connecting the log to the ship; Fig. 4 is an enlarged section on the line $x$—$x$, Fig. 3; Fig. 5 is a vertical sectional view through a rotor and log embodying my invention; Fig. 6 is a section on the line $y$—$y$, Fig. 5, parts being omitted; Fig. 7 is a detail of the make-and-break mechanism; Fig. 8 is a section on the line $a$—$a$, Fig. 5, parts being omitted; Fig. 9 is an end view of the log and rotor shown in Fig. 5; Fig. 10 is a top plan view of the gearing connecting the rotor with the make-and-break mechanism; Fig. 11 is a section on the line $b$—$b$, Fig. 10; Fig. 12 is an enlarged section on substantially the line $c$—$c$, Fig. 5, parts being omitted; Fig. 13 is a view of the flexible connection between the housing of the make- and-break device and cable; Fig. 14 is a section on the line $d$—$d$, Fig. 13; Fig. 15 is a detail of the connection between the gearing and the make-and-break device; Figs. 16 and 17 are two views of another portion of said connection.

It is now the universal custom to secure the log of the ship to the taffrail and have the rotor trailing some distance behind the ship. I have devised a ship's log in which the rotor may be placed in close proximity to the hull of the vessel, preferably at the side thereof, and about midway the length of the ship, although the particular location is not essential to the invention. The advantages of placing the rotor in this position are that it is much less liable to become entangled in seaweed and can be put out or taken in much more readily from this point than when it is trailing behind the ship. Moreover, it does not need to be taken in when the ship stops because there is no possibility that either the rotor or the connection leading to the ship can become entangled in the propeller as is the case where the rotor is trailing behind the ship.

Fig. 1 shows in general the way in which my improved log will be used, and in said figure, 3 designates a ship of any suitable construction having the pilot-house 4. The rotor of the log is shown at 5 and this is sustained by a suitable framework 6 which is secured to the vessel by a flexible connection of such a length that the rotor and frame 6 are situated at the side of the vessel. So far as this feature of the invention is concerned, the log may be either a mechanical log or an electric log. I have herein shown an electric log in which the rotation of the rotor 5 makes and breaks a circuit which leads through the connection 7 to a suitable indicator 8 which may be situated in any convenient location on the ship, preferably within the pilot-house. Where the rotor is located at the side of the vessel, as above described, it is essential that means be provided for preventing said rotor from coming in contact with the vessel, and I may accomplish this either by providing a rotor protector which is herein shown as in the form of arms or legs 9 extending from the frame 6 and adapted to engage the side of the vessel and space the rotor therefrom, as shown in Figs. 1 and 2, or by supporting said rotor at the end of an arm 10 that is carried by the end of a support 11 projecting from the side of the vessel sufficiently so that the rotor 5 cannot contact with the vessel side as shown in Figs. 3 and 4. It is desirable that the rotor be able to move up and down to correspond with the wave motion of the water and for this purpose the connection 7 may be flexible to permit the motion of the rotor, or said connection may be in the form of articulated tube sections, as shown in Fig. 2, wherein the casing 6 having the spacing legs 9 is pivoted to the end of a link or tube 12 by a ball-and-socket joint 13, and the latter is pivotally connected to the ship's side by a ball-and-socket joint 14. In this case the point 14 where the connection leads through the side of the ship may be below the water line. To permit this movement of the rotor in the construction shown in Figs. 3 and 4, I propose to make the support 11 in the form of a shaft which is journaled in the ship's side and which may be conveniently counterweighted within the ship by a counterweight 15. This feature of my invention which consists in placing the rotor at the side of the vessel and providing means for preventing it from engaging the vessel may be carried out in many other ways than that shown herein, and therefore I do not wish to be limited to the construction illustrated. Further, this feature of the invention may be embodied in logs of various types, that is, mechanical logs or electric logs. I have herein illustrated it as embodied in an electric log which has many novel features and will now be described. This electric log comprises a make-and-break device located within the casing 6, suitable electric connections between said make-and-break device and the indicator 8, and driving connections interposed between the make-and-break device and the rotor whereby the rotary movement of the rotor operates the make-and-break device. The casing 6 is herein shown as provided with a suitable chamber 16 in which the make-and-break device is situated, and said make-and-break device comprises a fixed contact 17 which is insulated from the casing and which is connected to a wire 18 that leads to the instrument 8, and a movable contact 19 carried by a resilient arm 20 and grounded on the casing. The resiliency of the arm 20 normally tends to move the contact 19 toward the contact 17 and the contacts are separated at suitable intervals by a cam 21 which is rotated from the rotor 5 by mechanism which will be more fully hereinafter described. The contacts 17 and 19 are herein shown as supported in a holder which is situated within the chamber 16. This holder is best seen in Fig. 7 and it comprises two tubular end portions 22, 23 which fit within the chamber 16 and are connected by the base portion 24. This base portion 24 has a block 25 of insulating material secured thereto, and on this is supported a plate 26 which carries at one end the contact 17. The other end of the plate 26 is bent upwardly, as at 27 and rests against a block 28 of insulating material fitted within the end of the chamber 16 and provided with an aperture through which the wire 18 passes. The arm 20 carrying the movable contact 19 is secured to the portion 22 of the holder, as plainly seen in Fig. 5. The wire 18 may be connected to the plate 26 in a variety of ways, but I have shown it herein as clamped thereto by a clamping plate 30 which is secured in place by the screws 29. The end of the wire can readily be bent around the screws, so as to make a better and firmer connection. The cam 21 is supported on a shaft 31 which is rotatably mounted in a bearing 32 carried by the portion 23 of the holder, said shaft preferably having an extension 34 which is supported in an arm 35.

Inasmuch as the rotor 5 will rotate quite rapidly, I have interposed a reducing gearing between said rotor and the shaft 31 by which the rotary movement is transmitted from the rotor to the shaft at a reduced speed. This gearing is located in the chamber 36 formed in the casing 6, which chamber is separate from the chamber 16. I prefer to place the gearing in a different chamber from that in which the make-and-break devices are located because it is essential that the chamber containing the make-and-break devices be absolutely water-tight, so that no water can get into it, and I can better accomplish this by locating the gearing in a separate chamber.

The rotor 5 as herein shown is formed with a hollow body 37 on which the wings are mounted. This body is loosely supported on the projecting end of the shaft 38 that is journaled in suitable roller and ball bearings 39 carried by the casing 6. I have herein shown the shaft 38 as projecting through an aperture in the end of the body 37 and as carrying at its end a winged nut 40, the wings of which engage lugs 41 on the interior of the body. The aperture in the body is larger than the shaft so that the rotor can assume different angular positions and a spring 42 confined between the casing 6 and the head holds the rotor in operative position. The inner end of the shaft 38 connects with the reducing gearing located in the chamber 36. Any suitable reducing gearing might be employed without departing from the invention. That herein shown is compact and simple and will now be described.

43 designates a driving member in the form of a worm which is loosely mounted on a shaft 44 and is connected to the shaft 38 to be driven thereby. This worm 43 meshes with a worm-gear 45 on a vertical shaft 46, and said shaft has thereon a spur-gear 47 that meshes with and drives another spur-gear 48 on a shaft 49. The shaft 49 has thereon a worm 50 which meshes with and drives a worm gear 51 fast on the shaft 44. The shaft 44 is connected to the shaft 31 by a suitable connection hereinafter described. With this arrangement it will be seen that the rotation of the shaft 38 will be transmitted to the shaft 31, but at reduced speed. The shaft 44 is journaled in suitable bearings 52 carried by a base plate 53 which is suitably secured to the casing 6. This base plate forms the bearings for the lower ends of the shafts 46 and 49 and the upper ends of said shafts find bearing in an arm 54 which extends from the bearings 52. The connection between the shaft 38 and worm 43 will preferably be such that the driving connection will not be affected, even if the shafts 44 and 38 are out of line with each other. I have herein shown the worm 43 as having a flat head 55 which is received between the arms of a forked head 56 that is secured to and carried by the shaft 38. The connection between the shafts 44 and 31 is herein provided for by a shaft section 57 which is loosely connected both to the shaft 31 and to the shaft 44. As herein shown, the shaft 44 has formed thereon a head 58 provided with two arms 59 that are adapted to engage the arms 60 extending from the shaft section 57. The other end of the shaft section 57 is provided with a flattened portion 61 which is adapted to fit between two arms or wings 62 formed on the shaft 31.

To prevent any possibility of the water leaking into the chamber 16, I propose to provide a special bearing and packing for the shaft section 57. The bearing for this shaft section is sustained by a bushing 63 which is screwed into the casing 6 and which has a packing chamber 64 within which are two packing rings 65, 65 of raw-hide or some similar material which tightly fit the shaft 57. Each packing ring is backed by a metal plate 67 and the two plates are held in position by a spring 68. The shaft 57 is also provided with the conical bearing portion 69 which rests against a conical seat 70 formed in the casing 6 and is held against said seat by a spring 71. The packing rings 65, 65 will effectively prevent any water leaking in around the shaft 57 and the valve joint between the collar 69 and the seat 70 makes an additional seal against any leaking of water. The water will, of course, leak into the chamber 36 somewhat although it is my purpose to keep this chamber filled with lubricant so as to keep the water out; but even if the water does enter the chamber 36 it cannot leak into the chamber 16 and there is, therefore, no danger that the circuit will be short-circuited by accumulation of water. The holder for the contact is inserted into the chamber 16 from the left-hand end thereof and after this is in place this chamber is closed by a cap piece 72 which is screwed to the casing 6 and to prevent any water leaking into the casing around the wire 18, I have packed said end of the casing by a packing 73 of raw-hide or similar material which will make a water-tight joint. The shaft 57 is inserted from the right and in order that the end 61 thereof may be sure to enter the space between the fingers 62 when the parts are assembled, I propose to bevel each finger 62, as shown at 74, so that the finger 61 will readily enter the space regardless of the position of the shaft 31. Similarly I propose to make the arms 60 on the shaft 57 with the bevel faces, as shown in Fig. 17, so that when the parts are assembled, the fingers 59 and 60 will assume a proper relation to each other.

The wire 18 is preferably provided with a coating 75 of rubber or other water-proof material which coating extends clear in through the packing 73. This coating of rubber is then provided with a covering 76 of jute, hemp, or similar material, and the main body of the cable is provided with an outer coating or armor 77 which is preferably in the form of metallic wires which are wound around the cable to thoroughly cover the same. A cable made in this way is quite stiff and as it is desirable that the portion of the cable next to the casing should be sufficiently flexible to permit the rotor to move up and down readily with the waves, I have made a small section of the cable immediately adjacent the casing 6 without the exterior armor 77, such section of the cable being designated 78 and being shown best in Fig. 13. To make this portion of the cable sufficiently strong so that no strain will come on the wire 18, I propose to provide it with a plurality of strands of wire 79. These wires 79 are secured at one end to the cap 72 and at the other end to a clamping device to which the armor cables 77 are secured. The cap 72 is provided with the exterior screw-threaded portion 80 which is provided with the apertures 810 into which the ends of the wires 79 pass, and the ends of these wires are clamped to the cap 72 by the clamping nut 81 which is screw-threaded on the portion 80. The two strands 79 may be formed of a single length of wire which is passed through two apertures in a clamping member 82 and fits in a groove 83 formed therein. This clamping member 82 is secured to an anchor member 84 through which the cable passes. Said anchor member is provided with the annular shoulder 85 and the end of each one of the wire strands 77 is bent back on itself to engage said shoulder 85. This makes a simple way of connecting the anchor member 84 to the cable so that all the strain thereon will come on the wire strands 77 instead of on the wire 18, and since the casing 6 is secured to this anchor member by the wires 79, it will be seen that no strain can come on the center wire 18 forming part of the electric circuit. The wires 79 are preferably wrapped partially about the unarmored part 78 of the cable, shown best in Fig. 13, and are connected together by clips 86 at the points where they meet. The wires 79 also provide a ground connection between the casing 6 and the armor of the cable 77 thereby to complete the electric circuit independently of the water. The cap 72 and the anchor member 84 are both preferably provided with loosely-fitting wear rings 87 so that if these parts strike the side of the ship, the rings will form an anti-friction bearing. Similarly, each of the legs 9 will be provided with a roll 88 for the same purpose.

To facilitate taking the log in or putting it out, I have shown a ring 90 through which the cable 7 loosely passes, and which has a flexible connection 91 secured thereto which leads onto the deck of the vessel. When the log is in operation, this ring 90 may be in the position shown in Fig. 1. When it is desired to haul the log on board the ring is slipped down on the cable until it is adjacent the head 84 and the log can then be drawn up on deck.

I have found from practice that it is an advantage to have the rotor situated some distance back from the protecting arms 9. It will be noted from Fig. 5 that the arms 9 do not extend over the blades of the rotor. This construction has the advantage that the movement of the arms 9 through the water in front of the rotor does not affect the accurate operation thereof as would be the case if the arms were long enough to extend to the rear of the blades, so that the rotor would be inclosed by the arms.

In the embodiment shown in Fig. 5 the rotor protector is formed on a separable part of the casing 6. Said casing is made with the main portion in which the chamber 16 is formed and with the separable portion which is screw-threaded to the main portion and in which the chamber 36 is formed. The arms 9 constituting the rotor protector extend from the separable portion of the casing.

While I have illustrated herein some selected embodiments of my invention which are sufficient to describe the principle thereof, yet I do not wish to be limited to the constructional features shown.

Having fully described my invention, what I claim as new and desire to secure by Letters Patent is:—

1. In a ship's log, the combination with a frame, of flexible means to tow said frame in close proximity to the hull of a vessel, whereby said frame is free to move laterally in any direction independently of the vessel, an actuator flexibly sustained by the frame and operated by its movement through the water, an indicator situated at a distance from the actuator and means to operate the indicator by the actuator, said frame having means to prevent the actuator from contacting with the vessel.

2. In a ship's log, the combination with a frame, of flexible means to tow said frame in close proximity to the hull of a vessel, whereby said frame is free to move laterally in any direction independently of the vessel, an actuator flexibly sustained by the frame and operated by its movement through the water, said frame having means to prevent the actuator from contacting with the vessel, and electrical indicator-operating means operated by the actuator.

3. In a ship's log, the combination with an actuator adapted to be operated by its movement through the water, of means to tow said actuator in close proximity to a vessel, said means having the portion adjacent the actuator more flexible than the remaining portion thereof whereby the actuator may readily aline itself to the course of the vessel independently of the movement thereof, means to prevent the actuator from contacting with the vessel, a make-and-break device operated by the actuator, an electrical conductor extending from the make-and-break device through both portions of said towing means, and an indicator connected to said conductor.

4. In a ship's log, the combination with an actuator adapted to be operated by its movement through the water, of a cable for towing said actuator in close proximity to the vessel, said cable being armored except for the portion adjacent the actuator, the unarmored portion being more flexible than the armored portion to permit the actuator to readily aline itself with the course of the vessel.

5. In a ship's log, the combination with an actuator adapted to be operated by its movement through the water, of a cable for towing said actuator in close proximity to the vessel, said cable being armored except for the portion adjacent the actuator, the unarmored portion being more flexible than the armored portion to permit the actuator to readily aline itself with the course of the vessel, and means to prevent the actuator from contacting with the vessel.

6. In a ship's log, the combination with an actuator adapted to be operated by its movement through the water, of a cable for towing said actuator in close proximity to the vessel, said cable being armored except for the portion adjacent the actuator, the unarmored portion being more flexible than the armored portion to permit the actuator to readily aline itself with the course of the vessel, and flexible means extending the length of the unarmored portion of the cable to resist torsional strain induced by the operation of the actuator.

7. In a ship's log, the combination with a rotor, of a frame or casing on which the rotor is mounted, arms extending from the frame and arranged to protect the rotor and prevent it from engaging with the side of the vessel when the arms rest thereagainst, and a roll carried by each arm and turning about an axis parallel to the direction of movement of the rotor through the water.

8. In a ship's log, the combination with a frame or casing, of a rotor sustained thereby and situated at one end thereof, arms extending from the casing and arranged to protect the rotor from engagement with the side of a vessel when said arms rest against the vessel, and a roll carried by the end of each arm and turning about an axis parallel to the direction of movement of the rotor through the water.

9. In a ship's log, the combination with a frame or casing, of a rotor sustained thereby and situated at one end thereof, arms extending from the casing and arranged to protect the rotor from engagement with the side of a vessel when said arms rest against the vessel, and rolls carried by the ends of the arms and another roll encircling the front end of the casing and rotatable thereabout.

10. In a ship's log, the combination with a casing having two chambers separated by a partition forming part of the casing, means for packing one chamber to make it water tight, a make-and-break device in said last named chamber, gearing in the other chamber, means connecting said gearing to the make-and-break device, a rotor sustained by the casing, means connecting said rotor to the gearing, and arms extending from the casing to prevent the rotor in any working position thereof from contacting with the side of the vessel.

11. In a ship's log, the combination with a casing, of a make-and-break device therein, a rotor sustained by the casing operative connection between said rotor and the make-and-break device, an indicator, and a comparatively stiff armored cable constituting an electric circuit extending from said make-and-break device to said indicator, the portion of the cable adjacent the casing being more flexible than the remaining portion thereof to permit the casing to move up and down freely.

12. In a ship's log, the combination with a casing having two chambers therein, of a make-and-break device in one chamber, a shaft for operating said make-and-break device, operating mechanism for the shaft situated in the other chamber, a rotor carried by the casing, connections between the rotor and operating mechanism, and a detachable connection between said shaft and said operating mechanism which will permit the mechanism to be connected to the shaft in any position of the latter when said mechanism is inserted into the chamber.

13. In a ship's log, the combination with a casing formed with both a water-tight chamber and another chamber which are separated by a partition integral with the casing, of a make-and-break device in the water-tight chamber supported independently of said partition, an operating mechanism in the other chamber also supported independently of said partition, a rotary shaft extending through the partition between said chambers and mechanically connecting the operating mechanism with the make-and-break device.

14. In a ship's log, the combination with a casing having a water-tight chamber and another chamber separated therefrom by a partition, of a make-and-break device in the water-tight chamber, means separate from said partition for supporting said make-and-break device, an operating mechanism in the other chamber, means in said other chamber independent from the partition for supporting said operating mechanism, a rotary shaft extending through the partition between said chambers and mechanically connecting the operating mechanism with the make-and-break device, and a resiliently-sustained packing for said shaft.

15. In a ship's log, the combination with a casing having a water-tight chamber and another chamber separated therefrom by a partition, of a make-and-break device in the water-tight chamber, an operating mechanism in the other chamber, means independent from said partition to support both the make-and-break device and the operating mechanism, a rotary shaft extending through the partition between said chambers and mechanically connecting the operating mechanism with the make-and-break device, said shaft having a tapered collar and the casing having a tapered shoulder to fit the collar, and a spring to engage said shaft and hold the collar against the shoulder.

16. In a ship's log, the combination with a casing having two chambers separated by a partition, one of which chambers is water-tight, of a rotary member in the water-tight chamber, operating mechanism therefor in the other chamber, means separate from said partition to sustain the operating mechanism, a connection extending through said partition and connecting the operating mechanism with the rotary member, a packing for said connection, and resilient means to hold the packing in contact with said connection.

17. In a ship's log, the combination with a casing having a water-tight chamber and also another chamber separated therefrom by a partition which constitutes an integral part of the casing, of a make-and-break device in the water-tight chamber, operating mechanism in the other chamber, and a rotary shaft extending through said partition and mechanically connecting the operating mechanism with the make-and-break device.

18. In a ship's log, the combination with a casing having a water-tight chamber and also another chamber separated therefrom by a partition which is part of the casing, of a make-and-break device in the water-tight chamber, operating mechanism in the other chamber, and a rotary shaft extending through said partition and detachably connected to both the operating mechanism and the make-and-break device whereby the latter is mechanically operated from the former.

19. In a ship's log, the combination with a frame, of means to tow said frame in close proximity to the hull of a vessel, a rotor sustained by said frame, arms extending from the frame and arranged to protect the rotor from engagement with the side of the vessel, said rotor being situated beyond said arms whereby the latter do not affect the correct operation thereof as the device is towed through a body of water.

20. In a ship's log, the combination with a frame, of means to tow said frame in close proximity to the hull of a vessel, a rotor sustained by the frame at one end thereof, an indicating means operated by the rotor, and arms extending from the frame and terminating in front of the rotor and adapted to protect the rotor from engagement with the vessel.

21. In a ship's log, the combination with a casing, of a make-and-break device situated therewithin, a rotor sustained by the casing, means operatively connecting said rotor to the make-and-break device, a comparatively stiff unyielding cable connected to the vessel, for towing said casing in close proximity to the hull of said vessel and flexibly connected to said casing to permit the latter to readily aline itself to the course of the vessel independently of the movement thereof.

22. In a ship's log, the combination with a casing, of a make-and-break device therein, a shaft extending through one end of the casing, operative connections between said shaft and said make-and-break device, and a rotor exterior to the casing and flexibly mounted on said shaft.

23. In a ship's log, the combination with a body provided with a chamber, of a rotor protector secured to said body, a rotor protected by the rotor protector and adapted to be actuated by its movement through the water, indicator-actuating means within said chamber, operative connections between said means and the rotor, and means to tow said body and rotor protector in close proximity to the hull of a vessel, said protector preventing the rotor from contacting with the vessel.

In testimony whereof, I have signed my name to this specification, in the presence of two subscribing witnesses.

THOMAS H. McQUOWN.

Witnesses:
   LOUIS C. SMITH,
   THOMAS J. DRUMMOND.

---

Copies of this patent may be obtained for five cents each, by addressing the "Commissioner of Patents, Washington, D. C."